(12) United States Patent
Murray et al.

(10) Patent No.: US 9,166,713 B2
(45) Date of Patent: Oct. 20, 2015

(54) SYSTEM FOR PROVIDING ACCESS TO OPERATION INFORMATION

(75) Inventors: Kevin Murray, Fordingbridge (GB); David Fink, Efrat (IL); Ezra Darshan, Beit Shemesh (IL)

(73) Assignee: Cisco Technology Inc., San Jose, CA (US)

(*) Notice: Subject to any disclaimer, the term of this patent is extended or adjusted under 35 U.S.C. 154(b) by 3121 days.

(21) Appl. No.: 10/555,214

(22) PCT Filed: Jun. 28, 2005

(86) PCT No.: PCT/IL2005/000685
§ 371 (c)(1),
(2), (4) Date: Jan. 4, 2006

(87) PCT Pub. No.: WO2006/018827
PCT Pub. Date: Feb. 23, 2006

(65) Prior Publication Data
US 2007/0011447 A1  Jan. 11, 2007

Related U.S. Application Data

(60) Provisional application No. 60/601,890, filed on Aug. 16, 2004.

(30) Foreign Application Priority Data

Aug. 16, 2004 (GB) .................................. 0404182.7

(51) Int. Cl.
*H04N 5/262* (2006.01)
*H04H 60/07* (2008.01)
(Continued)

(52) U.S. Cl.
CPC .............. *H04H 60/07* (2013.01); *H04H 60/37* (2013.01); *H04L 9/14* (2013.01); *H04N 9/8205* (2013.01);
(Continued)

(58) Field of Classification Search
CPC ....... H04H 60/07; H04H 60/23; H04N 5/783; H04N 21/8042; H04L 9/14
USPC .......................... 375/240.01–240.26; 382/232
See application file for complete search history.

(56) References Cited

U.S. PATENT DOCUMENTS 5,878,135 A    3/1999  Blatter et al.
6,332,030 B1 * 12/2001  Manjunath et al. ........... 382/100
(Continued)

FOREIGN PATENT DOCUMENTS

EP    0 674 440 A2   9/1995
EP    1 122 728 A1   8/2001
(Continued)

OTHER PUBLICATIONS

H. Schulzrinne, et al., "RTP: A Transport Protocol for Real-Time Applications" (Network Working Group, RFC 1889, Category: Standards Track; Jan. 1996).
(Continued)

*Primary Examiner* — Tung Vo
(74) *Attorney, Agent, or Firm* — Hahn Loeser & Parks LLP

(57) ABSTRACT

A method for providing access to operation information relating to a digital signal, including providing a digital signal encoded, in accordance with a layered encoding scheme, in a plurality of layers, and extracting operation information from a first layer of encoding within the digital signal, and placing the extracted information in a data section in a second layer of encoding within the digital signal. Related methods and apparatus are also described.

9 Claims, 2 Drawing Sheets

(51) Int. Cl.

| | |
|---|---|
| H04H 60/37 | (2008.01) |
| H04N 9/82 | (2006.01) |
| H04N 21/2343 | (2011.01) |
| H04N 21/2362 | (2011.01) |
| H04N 21/2389 | (2011.01) |
| H04N 21/4147 | (2011.01) |
| H04N 21/4402 | (2011.01) |
| H04N 21/6332 | (2011.01) |
| H04N 21/654 | (2011.01) |
| H04N 21/845 | (2011.01) |
| H04N 21/2347 | (2011.01) |
| H04N 21/462 | (2011.01) |
| H04L 9/14 | (2006.01) |
| H04H 60/23 | (2008.01) |
| H04H 60/65 | (2008.01) |
| H04L 29/06 | (2006.01) |
| H04N 5/783 | (2006.01) |
| H04N 9/804 | (2006.01) |

(52) U.S. Cl.
CPC ....... *H04N 21/2343* (2013.01); *H04N 21/2362* (2013.01); *H04N 21/23476* (2013.01); *H04N 21/23895* (2013.01); *H04N 21/234327* (2013.01); *H04N 21/4147* (2013.01); *H04N 21/440281* (2013.01); *H04N 21/462* (2013.01); *H04N 21/6332* (2013.01); *H04N 21/654* (2013.01); *H04N 21/8451* (2013.01); *H04H 60/23* (2013.01); *H04H 60/65* (2013.01); *H04L 63/0428* (2013.01); *H04L 2209/60* (2013.01); *H04N 5/783* (2013.01); *H04N 9/8042* (2013.01)

(56) References Cited

U.S. PATENT DOCUMENTS

| | | | | |
|---|---|---|---|---|
| 6,683,987 | B1* | 1/2004 | Sugahara | 382/235 |
| 6,907,081 | B2* | 6/2005 | Mantchala et al. | 375/240.26 |
| 7,035,278 | B2* | 4/2006 | Bertram et al. | 370/458 |
| 7,096,488 | B1* | 8/2006 | Zhang et al. | 725/105 |
| 7,124,303 | B2* | 10/2006 | Candelore et al. | 713/193 |
| 7,167,560 | B2* | 1/2007 | Yu | 380/200 |
| 7,298,959 | B1* | 11/2007 | Hallberg et al. | 386/284 |
| 7,313,814 | B2* | 12/2007 | Zhu et al. | 726/6 |
| 7,379,607 | B2* | 5/2008 | Srinivasan et al. | 382/238 |
| 7,397,819 | B2* | 7/2008 | Kobayashi | 370/469 |
| 7,406,176 | B2* | 7/2008 | Zhu et al. | 380/200 |
| 7,603,024 | B1* | 10/2009 | Chun | 386/248 |
| 2004/0047417 | A1 | 3/2004 | Gordon et al. | |
| 2005/0036557 | A1* | 2/2005 | Balakrishnan et al. | 375/240.28 |

FOREIGN PATENT DOCUMENTS

| | | |
|---|---|---|
| WO | WO 01/35669 A1 | 5/2001 |
| WO | WO 03/010970 A2 | 2/2003 |

OTHER PUBLICATIONS

H. Schulzrinne, et al., "RTP Profile for Audio and Video Conferences with Minimal Control" (Network Working Group, RFC 1890, Category: Standards Track; Jan. 1996).

"Information technology—Generic coding of moving pictures and associated audio information: Systems" (ISO/IEC 13818-1 (2d ed.); Dec. 1, 2000).

"Information technology—Generic coding of moving pictures and associated audio information: Systems" (ISO/IEC 13818-2 (2d ed.); Dec. 15, 2000).

Mar. 29, 2010 Office Communication in connection with EP 05 754 983.4 (8 pgs.).

Sep. 25, 2009 Supplementary Search Report in connection with EP 05 75 4893.

D. Curet et al., "FlexMux & RTP & RTCP" (text for proposed amendment to MPEG4's FlexMux tool) (ISO/IEC JTC1/SC29/WG11, MPEG99/M5210, Melbourne, Australia).

D. Hoffman et al., "RTP Payload format for MPEG1/MPEG2 Video" (RFC2250, Jan. 1998).

"Transmission of Non-Telephone Signals—Information Technology—Generic Coding of Moving Pictures and Associated Audio Information : Systems," ITU-T Recommendation H.222.0 (International Telecommunication Union, Jul. 1995).

Apr. 26, 2011 Office Communication in connection with prosecution of EP 05 754 983.4.

Jan. 31, 2011 Office Communication in connection with prosecution of EP 05 754 983.4.

Apr. 12, 2012 Office Communication in connection with prosecution of EP 12 15 4280.7.

Apr. 23, 2012 Office Communication in connection with prosecution of EP 12 15 4284.9.

Related Israel Patent Office Action for Application No. 180769 dated Nov. 19, 2012.

EP Examination report for Application No. 12 154 280.7-2223 dated Dec. 5, 2012.

EP Examination report for Application No. 12 154 284.9-2223 dated Dec. 11, 2012.

* cited by examiner

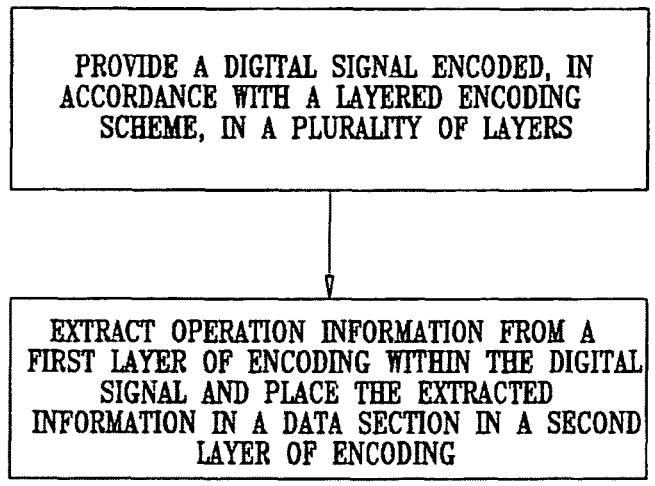
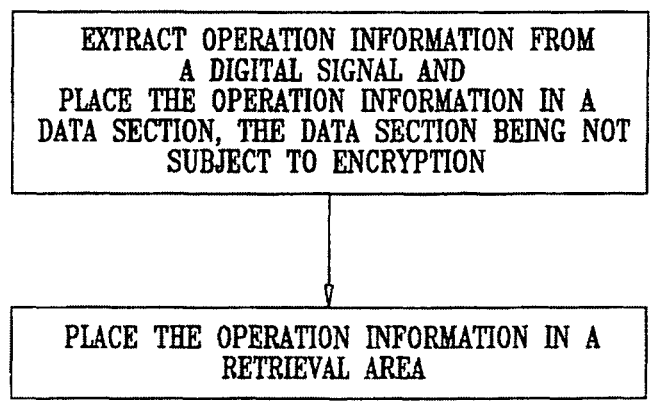

SYSTEM FOR PROVIDING ACCESS TO OPERATION INFORMATION

RELATED APPLICATION INFORMATION

The present application is a filing under 35 USC §371 of PCT/IL2005/000685, filed on 28 Jun. 2005, which claims priority from UK Patent Application GB 0418279.6 filed 16 Aug. 2004, and U.S. Provisional Patent Application 60/601,890 filed 16 Aug. 2004, the disclosures of which are hereby incorporated by reference.

FIELD OF THE INVENTION

The present invention relates to apparatus and methods for providing access to content in a data stream.

BACKGROUND OF THE INVENTION

One key aspect of the efficient operation of PVRs (Personal Video Recorders) that record a digital television signal is the ability to quickly, easily, and reliably identify places within a recorded video stream that correspond to starts and ends of pictures, locations of certain picture types, and a time associated with a picture. All of the places within the recorded video stream that correspond to the starts and ends of pictures; locations of certain picture types; and time associated with the picture are typically carried as part of the digital video signal. However, the digital television signal is often encrypted (also termed "scrambled" in the art and throughout the present specification and claims) in order to ensure correct payment for access to the television signal. It is often desirable not to decrypt the television signal when the television signal is recorded; accessing the places within the recorded video stream that correspond to the starts and ends of pictures; locations of certain picture types; and time associated with the picture is therefore difficult. Even if the signal is decrypted upon recording, or is transmitted unencrypted, locating desired information can require searching through large amounts of the digital television signal, which can be a costly operation.

It is appreciated that while the following discussion concentrates on video based systems, the present invention can also be applied to other coding technologies such as audio or data coding systems. The use of the word "video" should not be taken as limiting the scope of the invention.

Newer video coding technologies, such as AVC (ISO/EEC 14496-10) make it even more important that the information is correctly signalled, since existing heuristic mechanisms for "guessing" the location, value and type of information are becoming ever more unreliable due to the changes in video coding technologies.

Digital video standards that are relevant to understanding the state of the art include the following published standards:
ISO/EEC 13818-1:2000, *MPEG-2 Systems Specification;*
ISO/EEC 13818-2:2000, *MPEG-2 Video Specification*, particularly Sections 6.3.3 and 6.3.8;
ISO/EEC 13818-1:2000/Amd.3:(2003), *Transport of AVC video data in MPEG-2 TS;*
ISO/IEC 14496-10:2003 *MPEG-4 AVC Video Specification*, particularly Sections 7.3.1, 7.4.1, Annex A, D.8.7, and D.9.7; and
Annex E of ETSI TS 101 154 V1.5.1 (2004-05), *Digital Video Broadcasting (DVB); Implementation guidelines for the use of Video and Audio Coding in Broadcasting Applications based on the MPEG-2 Transport Stream.*

Internet Engineering Task Force (IETF) Requests for Comment (RFCs) that are relevant to understanding the state of the art include the following published RFCs:
RFC 1889, *RTP: A Transport Protocol for Real-Time Applications*; and
RFC 1890, *RTP Profile for Audio and Video Conferences with Minimal Control.*

The following patent applications are believed to represent the state of the art:
PCT Patent Application PCT/IL00/00276 (published as WO 01/35669) of NDS Limited, and corresponding U.S. patent application Ser. No. 09/574,096 of Darshan et al; and
PCT Patent Application PCT/IL02/00534 (published as WO 03/010970) of NDS Limited, and corresponding U.S. patent application Ser. No. 10/479,373 of Darshan et al.

The disclosures of PCT Patent Application PCT/IL00/00276 (published as WO 01/35669) of NDS Limited, and corresponding U.S. patent application Ser. No. 09/574,096 of Darshan et al and PCT Patent Application PCT/IL02/00534 (published as WO 03/010970) of NDS Limited, and corresponding U.S. patent application Ser. No. 10/479,373 of Darshan et al. are hereby incorporated herein by reference.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, comprises apparatus and methods, typically implemented at a broadcast headend or other facility for data stream preparation, operative to extract information useful for efficient operation of devices such as PVRs from a digital signal prior to potential encryption thereof. The extracted information is then potentially placed in an unencrypted section of the data transmitted in a way that enables the receiving PVR (or other device) to easily locate and use the extracted information to identify locations of interest and the types of those locations.

There is thus provided in accordance with a preferred embodiment of the present invention providing a digital signal encoded, in accordance with a layered encoding scheme, in a plurality of layers, and extracting operation information from a first layer of encoding within the digital signal, and placing the extracted information in a data section in a second layer of encoding within the digital signal.

Further in accordance with a preferred embodiment of the present invention the digital signal includes a transport layer.

Still further in accordance with a preferred embodiment of the present invention the operation information is extracted from the transport layer.

Additionally in accordance with a preferred embodiment of the present invention the data section is not subject to encryption.

Moreover in accordance with a preferred embodiment of the present invention the data section is subject to encryption.

Further in accordance with a preferred embodiment of the present invention the data section is encrypted in accordance with an encryption scheme different from an encryption scheme used to encrypt the first layer.

Still further in accordance with a preferred embodiment of the present invention the operation information includes at least one of a location and type of access unit, timing information, and rendering information.

Additionally in accordance with a preferred embodiment of the present invention the layered encoding scheme includes an MPEG-stream.

Moreover in accordance with a preferred embodiment of the present invention the layered encoding scheme includes an MPEG-stream.

Further in accordance with a preferred embodiment of the present invention the layered encoding scheme includes an I-frame.

Still further in accordance with a preferred embodiment of the present invention the layered encoding scheme includes a P-frame.

Additionally in accordance with a preferred embodiment of the present invention the layered encoding scheme includes a B-frame.

Moreover in accordance with a preferred embodiment of the present invention the data section is optimized for implementation in hardware.

Further in accordance with a preferred embodiment of the present invention the extracted information is placed in the second layer when the extracted information changes relative to an earlier version of the extracted information.

Still further in accordance with a preferred embodiment of the present invention the extracted information is placed in the second layer when the layered encoding scheme changes from a default pattern.

Additionally in accordance with a preferred embodiment of the present invention, the method includes transmitting the digital signal and the data section to a receiving device.

Moreover in accordance with a preferred embodiment of the present invention the receiving device includes a personal video recorder (PVR).

Further in accordance with a preferred embodiment of the present invention, the method includes utilizing the operation information at the receiving device.

Still further in accordance with a preferred embodiment of the present invention the utilizing includes at least one of the following identifying at least one location of interest, identifying a type of at least one location of interest, and performing a trick mode operation.

Additionally in accordance with a preferred embodiment of the present invention the trick mode operation includes at least one of the following fast forward, slow motion forward, fast reverse, slow motion reverse, freeze frame, and random access.

There is also provided in accordance with another preferred embodiment of the present invention utilizing operation information from a data section of the digital signal, the data section having been produced by extracting operation information from the digital signal, and placing the operation information in the data section, the data section being not subject to encryption, and placing the operation information in a retrieval area.

Further in accordance with a preferred embodiment of the present invention the utilizing includes ensuring that correct video data is played back.

Still further in accordance with a preferred embodiment of the present invention the retrieval area includes an index table.

Additionally in accordance with a preferred embodiment of the present invention the extracting occurs when the digital signal is played back.

Moreover in accordance with a preferred embodiment of the present invention the extracting occurs when the digital signal is recorded.

Further in accordance with a preferred embodiment of the present invention the operation information includes at least one of a location and type of access unit, timing information, and rendering information.

Still further in accordance with a preferred embodiment of the present invention the data section is optimized for implementation in hardware.

There is also provided in accordance with a still another preferred embodiment of the present invention a method for providing access to operation information relating to a portion of a digital signal, the method including receiving a digital signal, the digital signal including a data section and at least one other section, the data section including operation information, utilizing the operation information, and placing the operation information in a retrieval area, wherein the one other section is encrypted, and the data section is not encrypted, and the one other section includes a copy of the operation information.

Further in accordance with a preferred embodiment of the present invention the utilizing includes ensuring that correct video data is played back.

Still further in accordance with a preferred embodiment of the present invention the retrieval area includes an index.

Additionally in accordance with a preferred embodiment of the present invention the extracting occurs when the digital signal is played back.

Moreover in accordance with a preferred embodiment of the present invention the extracting occurs when the digital signal is recorded.

Further in accordance with a preferred embodiment of the present invention the operation information includes at least a location and type of access unit, timing information, and rendering information.

Still further in accordance with a preferred embodiment of the present invention the data section is optimized for implementation in hardware.

There is also provided in accordance with a still another preferred embodiment of the present invention a digital signal provider providing an encoded digital signal, in accordance with a layered encoding scheme, in a plurality of layers, and an operation information extractor extracting operation information from a first layer of encoding within the digital signal, and placing the extracted information in a data section in a second layer of encoding within the digital signal.

There is also provided in accordance with a still another preferred embodiment of the present invention an operation information utilizer, utilizing operation information from a data section of the digital signal, the data section have been produced by an operation information extractor which extracts the operation information from the digital signal, and an operation information placer which places the operation information in the data section, the data section being not subject to encryption, and an operation information placer operative to place the operation information in a retrieval area.

There is also provided in accordance with a still another preferred embodiment of the present invention a digital signal receiver operative to receive the digital signal, the digital signal including a data section and at least one other section, the data section including operation information, an operation information utilizer, and an operation information placer, operative to place the operation information in a retrieval area, wherein the one other section is encrypted, and the data section is not encrypted, and the one other section includes a copy of the operation information.

BRIEF DESCRIPTION OF THE DRAWINGS

The present invention will be understood and appreciated more fully from the following detailed description, taken in conjunction with the drawing in which:

FIG. 2 and FIG. 3 are simplified flowchart illustrations of preferred methods of operation of the system of FIG. 1.

DETAILED DESCRIPTION OF A PREFERRED EMBODIMENT

Figure 1:
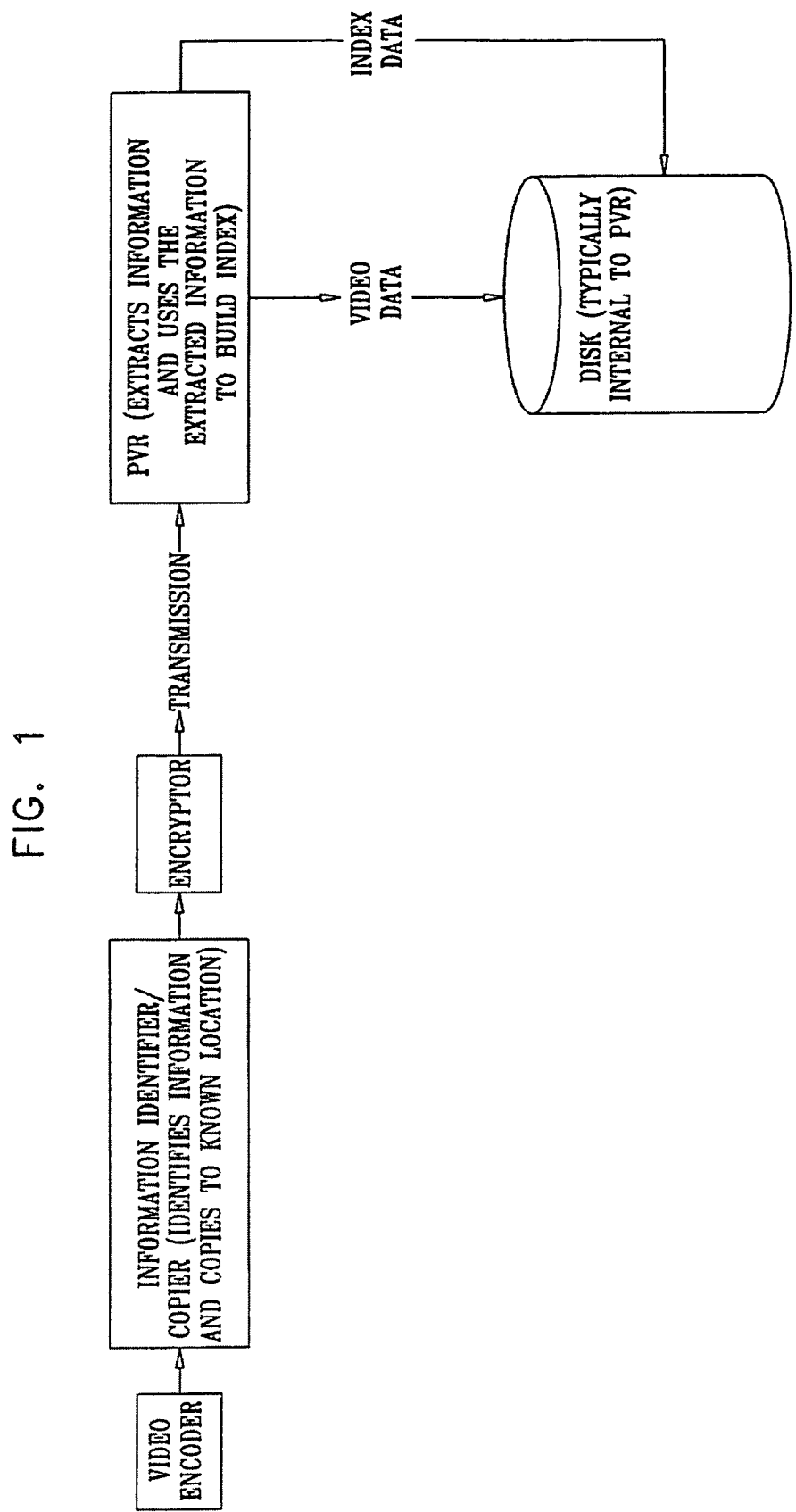
FIG. 1 is a simplified partly pictorial, partly block diagram illustration of a system for improving efficiency of location identification in a data stream, the system being constructed and operative in accordance with a preferred embodiment of the present invention.

Reference is now made to FIG. 1, which is a simplified partly pictorial, partly block diagram illustration of a system for improving efficiency of location identification in a data stream, the system being constructed and operative in accordance with a preferred embodiment of the present invention. The system of FIG. 1 is self-explanatory with reference to the discussion above and below.

Those skilled in the art will appreciate that the data stream preferably includes a transport layer. The transport layer preferably includes operation information. The operation information is preferably extracted from the transport layer. The extracted operation information is preferably placed in a data section. In some preferred embodiments of the present invention, the data section is preferably not subject to encryption. Alternatively, the data section preferably is subject to encryption. In some preferred embodiments of the present invention, the data section may preferably be encrypted using a different encryption scheme than the encryption scheme used to encrypt a video stream included in the digital signal.

The data section is preferably optimized for implementation in hardware, thereby making the data section easy to locate by a receiving device. For example, and without limiting the generality of the foregoing, in an MPEG-2 transport stream, a flag in a well known, fixed location would indicate the data section's presence. Typical examples of flags in a well known, fixed location which indicate the data section's presence include an adaptation field control flag and a transport private data flag in the adaptation field.

The operation information preferably includes at least one of:
 a location and type of access unit;
 timing information; and
 rendering information.

It is appreciated that the digital signal may preferably transmitted to the receiving device, and may preferably be encoded using any appropriate layered encoding scheme, including, but not limited to, MPEG-2 and MPEG 4. It is further appreciated that the layered encoding scheme preferably includes at least one I-frame.

In some preferred embodiments of the present invention, extracted information may preferably be placed in the data section when a condition is met. For example, and without limiting the generality of the foregoing, information may be placed in the data section when the extracted information is changed. For example, and without limiting the generality of the foregoing, if the data stream includes a signal that video is encoded as either a field or as a frame, information signalling the change of encoding may be placed in the data section when there is a transition in video encoding from field to frame or vice-versa.

Similarly, information may be placed in the data section when encoding is changed from a given default encoding pattern. For example, and without limiting the generality of the foregoing, in many MPEG encoding schemes, frames are typically encoded in an IBBP pattern (an I-frame followed by two B-frames followed by a P-frame). If the encoding pattern changes to IBP, information signalling the change of encoding pattern may be placed in the data section.

It is appreciated that the digital signal may preferably be an encrypted digital signal. Alternatively, the digital signal preferably may not be encrypted.

Those skilled in the art will appreciate that the receiving device may preferably include a set-top box or personal video recorder (PVR). The receiving device preferably utilizes the operation information, wherein the utilizing includes at least one of:
 identifying at least one location of interest;
 identifying a type of at least one location of interest; and
 performing a trick mode operation.

The utilizing and trick modes are described in greater detail below.

It is appreciated that, using the techniques described above, the present invention, in preferred embodiments thereof, enables the receiving device to utilize information without accessing the layer in which the information originally resided.

A preferred embodiment of the present invention suitable for use with MPEG-2 Systems (such as systems conforming to the ISO/IEC 13818-1:2000 specification, referred to above and incorporated herein by reference) is now described in more detail. It is appreciated that the MPEG-2 system is provided as a particular non-limiting example of an implementation of the present invention, and that the present invention may also be implemented in conjunction with other systems including, by way of further non-limiting example, IP based systems, such as RTP or DIRECTV Transport Protocol. In various parts of the description of the preferred embodiment of the present invention suitable for use with MPEG-2 Systems, details will be given which may be relevant for MPEG-4 Systems (ISO/IEC 14496-10:2003), and other systems as well.

In the case of MPEG-2 Systems (13818-1:2000), extracting information in accordance with the present invention is preferably achieved by placing a data structure in the user-private section of the adaptation layer data of the transport packet; persons skilled in the art will appreciate that the adaptation layer data is not encrypted. The presence of the adaptation layer data is signalled by a flag in the transport packet header (the adaptation field control flags), and the adaptation layer data itself (if more than one byte long) includes a flag (private data field flag) which signals the presence of private data. Thus it is a simple operation to identify the location of the desired information.

The exact format and frequency of the extracted information to be inserted can vary depending on the application, and the details of the video encoding algorithm(s) that are supported. As a non-limiting example, the table below shows one potential definition for the adaptation layer data, shown as a modification to the adaptation-field( ) structure defined in ISO/IEC 13818-1:2000 (see particularly-section 2.4.3.5 and table 2-6).

In the Table Below:
 MPEG_standard_field(s)/data refers to MPEG standard fields not discussed in detail in the table, in order to simplify the table;
 transport_private_data-length refers to an MPEG-defined field including the length of the private data;
 syntax_version indicates a version of the private data syntax. Preferably set to 0xB0. It is appreciated that Appendix E of ETSI TS 101 154 V1.5.1 (2004-05) describes a descriptor-like structure within a transport_private_data field of the adaptation field. Thus, the syntax_version value of 0xB0 has been chosen not to conflict with the tag values in ETSI TS 101 154 V1.5.1;

stream-type=1 refers to ISO/IEC 13818-2, and stream_type=2 refers to ISO/IEC 14496-10, it being appreciated that these are provided as non-limiting examples only;

time_code_present, when set to 1, indicates that a time code of the immediately following picture is present in the private data;

PTS_32 refers to the 32 most significant bits of a 33-bit PTS (presentation time stamp, see ISO/IEC 13818-1 Section 2.1.39 and 2.4.3.7) encoded in a PES header immediately following the present adaptation field;

time_code( ) refers to an SMPTE time code value encoded in 24 bits. The format of the time_code( ) is almost identical to a 25-bit format specified for a MPEG-2 GOP header (ISO/IEC 13818-2 Section 6.3.8). However, the marker_bit field specified for the MPEG-2 GOP header is not used in the time_code( ) field;

picture_type refers to a type of an immediately following picture, where a value of 1 indicates an I-picture, a value of 2 indicates a P-picture and a value of 4 indicates a B-picture;

frame_rate_code refers to the frame rate of a stream carried on the present PID, encoded as in 6.3.3 of ISO/IEC 13818-2: 2000;

profile_and_level_indication refers to a profile and level that is equal to or higher than any profile and level in any sequence in an associated video stream, encoded as in 6.3.3 of ISO/IEC 13818-2:2000;

profile_idc together with the level_idc field, indicates constraints in encoding of an AVC video stream, encoded as in ISO/IEC 14496-10:2003, Annex A;

level_idc together with the profile_idc field, indicates the constraints in encoding of the AVC video stream, encoded as in ISO/IEC 14496-10:2003, Annex A;

nal_ref_idc indicates whether the present frame is used for inter prediction of any other pictures, encoded as in ISO/EEC 14496-10:2003, sections 7.3.1 and 7.4.1; and entry_point_frame_count indicates how many subsequent frames must be decoded from the present point it is possible to reliably decode all subsequent frames. A value of 0 signifies that it is either unknown how many subsequent frames must be decoded from the present point or the number for frames which must be decoded from the present point is greater than a allowable maximum value. Frames for which the random_access_indicator is set will also have entry_point_frame_count equal to zero, since video can be reliably decoded from such frames.

It is appreciated that entry_point_frame_count is similar in concept to the recovery_point structure defined in ISO/IEC 14496-10:2003, sections D.8.7 and D.9.7.

TABLE 1

Syntax for Adaptation Field

| Syntax | No. of Bits | Mnemonic |
|---|---|---|
| adaptation_field ( ) { | | |
|     adaptation_field_length | 8 | uimsbf |
|     MPEG standard fields | 6 | bslbf |
|     transport_private_data_flag | 1 | '1' |
|     MPEG standard field | 1 | |
|     MPEG standard data | variable | |
|     if (transport_private_data_flag == '1') { | | |
|         transport_private_data_length | 8 | uimsbf |
|         syntax_version | 8 | uimsbf |
|         stream_type | 4 | uimsbf |
|         reserved | 3 | '111' |
|         time_code_present | 1 | |
|         PTS_32 | 32 | uimsbf |
|         if (time_code_present == '1') { | | |
|             time_code ( ) | 24 | |
|         } | | |
|         if (stream_type == '1' or '2') | | |
|             picture_type | 4 | uismbf |
|             frame_rate_code | 4 | uismbf |
|         } | | |
|         if (stream_type == '1') { | | |
|             profile_and_level_indication | 8 | uismbf |
|         } | | |
|         else if (stream_type == '2') { | | |
|             profile_idc | 8 | uismbf |
|             level_idc | 8 | uismbf |
|             nal_ref_idc | 2 | uismbf |
|             entry_point_frame_count | 6 | uismbf |
|         } | | |
|     } | | |
| } | | |

The mnemonic "uimsbf" stands for: unsigned integer, most significant bit first, and the mnemonic "bslbf" stands for: bit string, left bit first (see ISO/IEC 13818-1, Section 2.2.6).

When a signal is recorded, the information described in Table 1 can be extracted and held in a separate index table to simplify access. Alternatively, the information can be extracted when the video is played back.

When the recorded video is played back, the extracted information, as described in the table above, is preferably used to ensure that the correct video data is played back. The indicated mechanism also supports such operations as "trick modes", which are currently difficult to implement with the newer coding technologies such as AVC (14496-10) without the presence of assistance information as is provided in preferred embodiments of the present invention. For example, and without limiting the generality of the foregoing, the systems described in U.S. patent application Ser. No. 09/574,096 of Darshan et al and U.S. patent application Ser. No. 10/479, 373 of Darshan et al, referred to above and incorporated herein by reference, may be used to support trick mode operations.

The term "trick modes", in all its grammatical forms, as used throughout the present specification and claims includes, but is not limited to, one or more of the following: fast forward; slow motion forward; fast reverse; slow motion reverse; freeze frame; and random access. The term "random access" is used throughout the present specification and claims to refer both to random access to any particular point and to access to a specific predefined location or event, such as a next location or event, in a data stream.

Reference is now made to FIG. 2 and FIG. 3, which are simplified flowchart illustrations of preferred methods of operation of the system of FIG. 1. The methods of FIG. 2 and FIG. 3 are believed to be self-explanatory with reference to the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination. For example, each of the following subcombinations may be provided separately: the portion of the system and the associated methods described above as taking place at a broadcast headend or other facility for data stream preparation; and the portion of the system and the associated methods described above as taking place at a PVR or similar device.

It will be appreciated by persons skilled in the art that the present invention is not limited by what has been particularly shown and described hereinabove. Rather the scope of the invention is defined only by the claims which follow:

What is claimed is:

1. A method for providing access to operation information relating to a portion of a digital signal, the method comprising:
receiving a digital signal, the digital signal comprising a data section and at least one other section, the data section comprising operation information;
utilizing the operation information; and
placing the operation information in a retrieval area,
wherein:
the one other section is encrypted, and
the data section is not encrypted, and
the one other section comprises a copy of the operation information.

2. The method according to claim 1 and wherein the utilizing comprises ensuring that correct video data is played back.

3. The method according to claim 1 and wherein the retrieval area comprises an index.

4. The method according to claim 1 and wherein the extracting occurs when the digital signal is played back.

5. The method according to claim 1 and wherein the extracting occurs when the digital signal is recorded.

6. The method according to claim 1 and wherein the operation information comprises at least one of:
a location and type of access unit;
timing information; and
rendering information.

7. The method according to claim 1 and wherein the data section is optimized for implementation in hardware.

8. Apparatus for providing access to operation information relating to a portion of a digital signal, the apparatus comprising:
a digital signal receiver operative to receive the digital signal, the digital signal comprising a data section and at least one other section, the data section comprising operation information;
an operation information utilizer; and
an operation information placer, operative to place the operation information in a retrieval area,
wherein:
the one other section is encrypted, and
the data section is not encrypted, and
the one other section comprises a copy of the operation information.

9. Apparatus for providing access to operation information relating to a portion of a digital signal, the apparatus comprising:
means for receiving the digital signal, the digital signal comprising a data section and at least one other section, the data section comprising operation information;
means for utilizing operation information; and
means for placing information, the means for placing information operative to place the operation information in a retrieval area,
wherein:
the one other section is encrypted, and
the data section is not encrypted, and
the one other section comprises a copy of the operation information.

* * * * *